United States Patent [19]
Yeh

[11] Patent Number: 5,819,927
[45] Date of Patent: Oct. 13, 1998

[54] CD CONTAINER STORAGE DEVICE

[76] Inventor: Sheng-Fu Yeh, P. O.. Box 82-144, Taipei, Taiwan

[21] Appl. No.: 805,348

[22] Filed: Feb. 24, 1997

[51] Int. Cl.[6] .................................................. B65D 85/30
[52] U.S. Cl. .............................. 206/308.1; 206/387.15; 206/815; 220/780
[58] Field of Search ............................ 206/307.1, 308.1, 206/309, 387.15, 815; 312/293.1, 293.3, 9.9; 220/780, 323, 324

[56]  References Cited

U.S. PATENT DOCUMENTS

| | | | |
|---|---|---|---|
| 4,180,178 | 12/1979 | Turner | 220/780 |
| 4,187,953 | 2/1980 | Turner | 220/780 |
| 5,183,177 | 2/1993 | Yu | 206/387.15 |
| 5,320,244 | 6/1994 | Yu | 206/387.15 |

*Primary Examiner*—Paul T. Sewell
*Assistant Examiner*—Nhan T. Lam
*Attorney, Agent, or Firm*—A & J

[57] ABSTRACT

A CD container storage device includes a rectangular case and a cover wherein the rectangular case includes a rear wall, a top wall, a bottom wall and two lateral side walls and divided into two chambers by a vertical partition having a slot a front side thereof, and the cover is pivotally and slidably engaged with the rectangular case and has a hook member engageable with the slot.

1 Claim, 4 Drawing Sheets

CD CONTAINER STORAGE DEVICE

BACKGROUND OF THE INVENTION

1. Field of the Invention

This invention is related to a CD container storage device and in particular to one which is easy to use.

2. Description of the Prior Art

Devices for storing compact disks (CD) are well known in the art. However, none of the prior art devices available to the public has adequately met all of the goals of: simplicity of design; visual aesthetics; ready accessibility of contents; reliable operations mechanisms; visual accessibility of label information; and reasonable density of storage. Improvements in each of these areas is particularly desirable in the industry. Furthermore, it is of extreme value to provide a device which combines all of the desirable characteristics set forth above.

SUMMARY OF THE INVENTION

This invention is related to a CD container storage device.

It is the primary object of the present invention to provide a CD container storage device which is convenient to use.

It is another object of the present invention to provide a CD container storage device which can keep CD containers from dust.

It is still another object of the present invention to provide a CD container storage device which is simple in construction.

It is still another object of the present invention to provide a CD container storage device which is low in cost.

It is a further object of the present invention to provide a CD container storage device which is fit for mass production.

The foregoing objects and summary provide only a brief introduction to the present invention. To fully appreciate these and other objects of the present invention as well as as the invention itself, all of which will become apparent to those skilled in the art, the following detailed description of the invention and the claims should be read in conjunction with the accompanying drawings. Throughout the specification and drawings identical reference numerals refer to identical or similar parts.

BRIEF DESCRIPTION OF THE DRAWINGS

The invention is further described hereafter, by way of example only, with reference to the accompanying drawings, in which.

DETAILED DESCRIPTION OF THE PREFERRED EMBODIMENT

Figure 1:
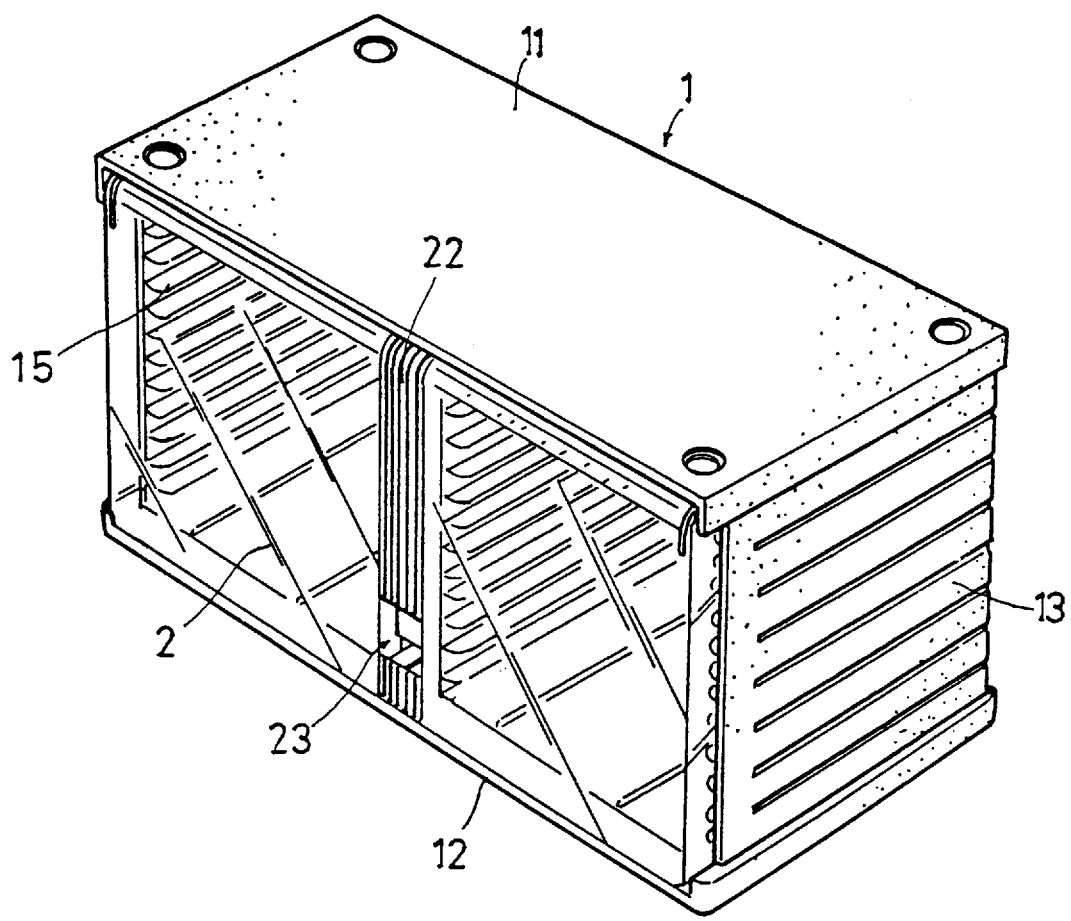
FIG. 1 is a perspective view of the present invention, shown in a closed condition.

For the purpose of promoting an understanding of the principles of the invention, reference will now be made to the embodiment illustrated in the drawings. Specific language will be used to describe same. It will, nevertheless, be understood that no limitation of the scope of the invention is thereby intended, such alterations and further modifications in the illustrated device, and such further applications of the principles of the invention as illustrated herein being contemplated as would normally occur to one skilled in the art to which the invention relates.

Figure 2:
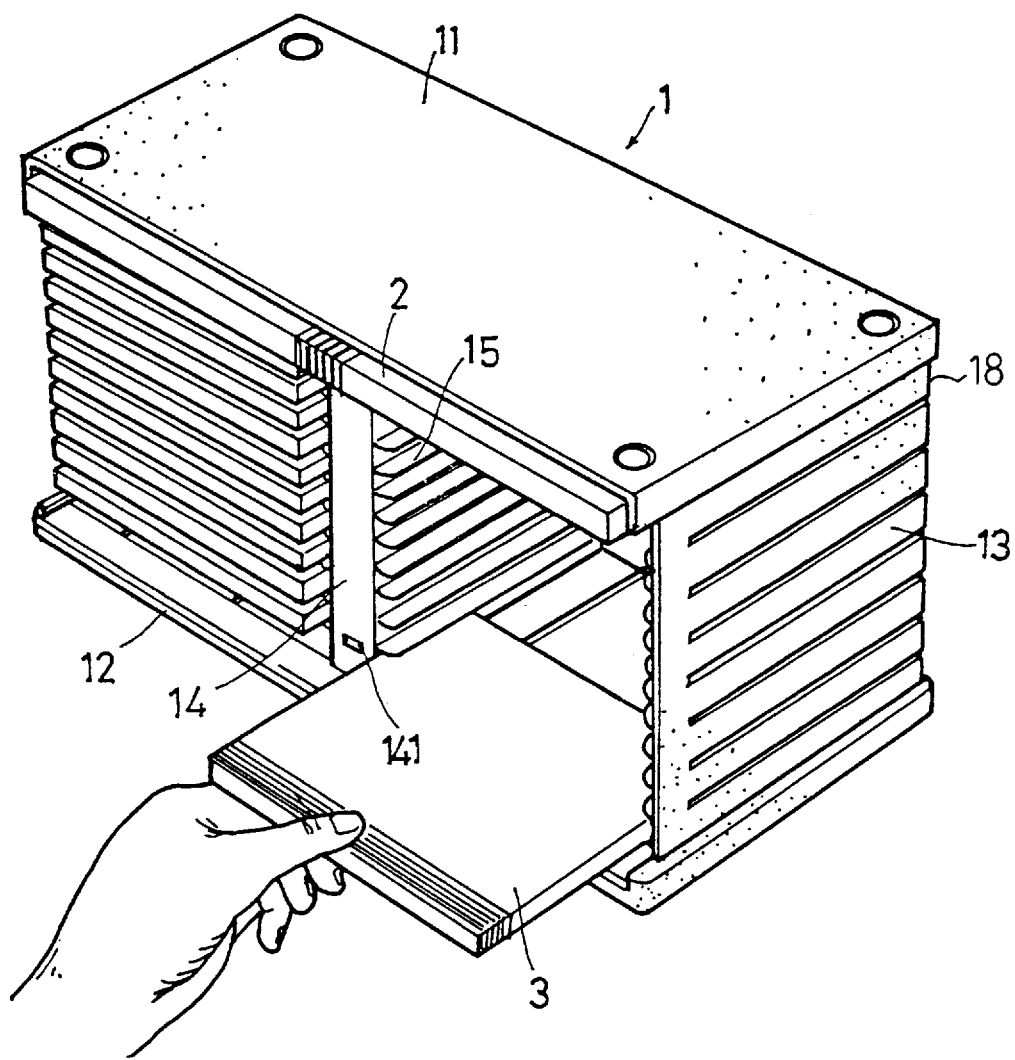
FIG. 2 is a perspectiview of the present invention, shown in an open condition.
Figure 3:
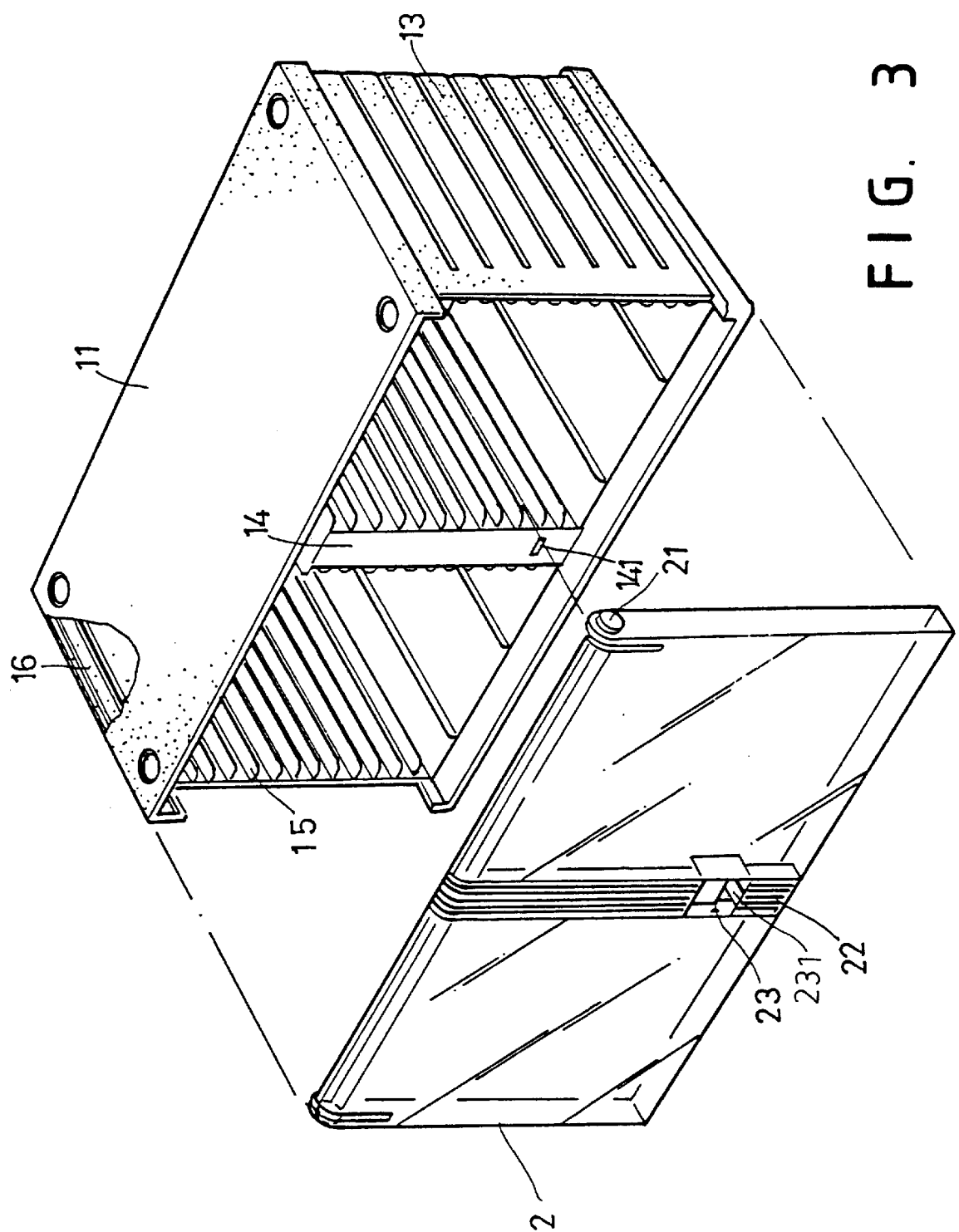
FIG. 3 is an exploded view of the present invention.

With reference to the drawings and in particular to FIGS. 1, 2 and 3, the CD container storage device according to the present invention mainly comprises a rectangular case 1 and a cover 2. The rectangular case 1 includes a rear wall 18, a top wall 11, a bottom wall 12 and two lateral side walls 13. The front side of the rectangular case 1 is connected with the cover 2. The interior of the rectangular case 1 is divided into two chambers by a vertical partition 14. The vertical partition 14 is formed with a slot 141 at a front side thereof (see FIG. 5). Between the upper end of the partition 14 and the lower side of the top wall 11 there is a distance which is slightly larger than the thickness of the cover 2. The upper end of the inner side of the two lateral side walls 13 is formed with a horizontal groove 16 (see FIG. 4). There are a plurality of equidistant supporting racks 15 at the inner sides of the lateral side walls 13 and the two sides of the vertical partitions 14 for receiving CD containers 3.

Figure 4:
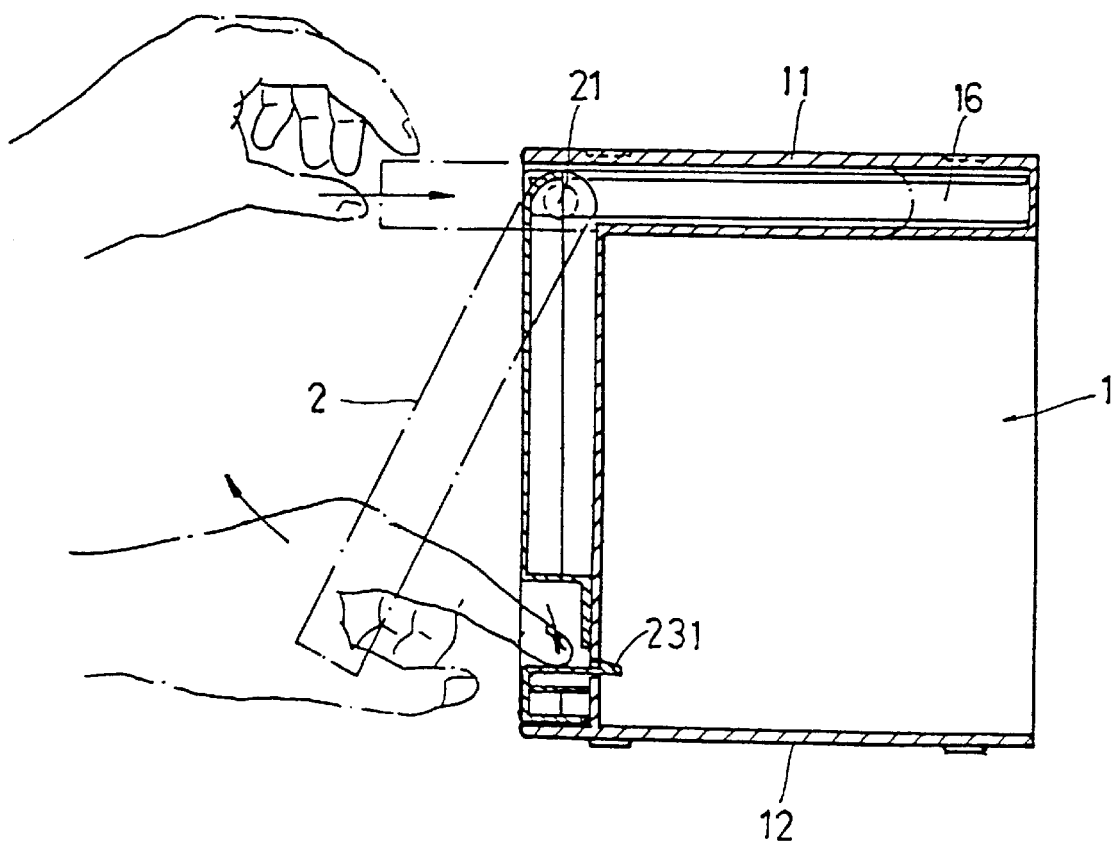
FIG. 4 illustrates how to open the present invention.
Figure 5:
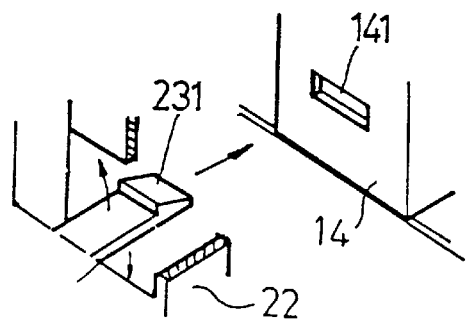
FIG. 5 illustrates how the hook member of the cover is engaged with the slot of the vertical partition.

Referring to FIGS. 3 and 4, the upper side of the cover 2 is formed with two cylindrical protuberances 21 at both ends adapted to be slidably engaged with the grooves 16 of the rectangular case 1. The intermediate portion 22 of the cover 2 has a vertical rib 22 for reinforcing the struture of the cover 2. The vertical rib 22 is formed with a recess 23 provided with a hook member 231 extending inwardly out of the rear wall of the cover 2 and engageable with a slot 141 of the front side of the vertical partition 14 (see FIG. 5).

When desired to open the CD container storage device according to the present invention, it is only necessary to put a finger into the recess 23 of the vertical rib 22 of the cover 2 and press the hook member 231 downward to disengage the hook member 231 from the slot 141 of the vertical partition 14. Then, the cover 2 is rotated upwardly and pushed into the grooves 16. When desired to close the CD container storage device, simply pull out the cover 2 and turn downward to engage the hook member 231 with the slot 141.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

I claim:

1. A CD container storage device comprising:
    a rectangular case comprising includes a rear wall, a top wall, a bottom wall and two lateral side walls, interior of said rectangular case being divided into two chambers by a vertical partition, said vertical partition having a slot a front side thereof, an upper end of both inner sides of said lateral side walls being formed with a horizontal groove, a plurality of equidistant supporting racks being formed at said inner sides of said lateral side walls and two sides of said vertical partitions for receiving CD containers; and a cover having an upper side formed with two cylindrical protuberances at both ends of said upper side adapted to be slidably engaged with said horizontal grooves of said rectangular case, an intermediate portion of said cover having a vertical rib for reinforcing struture of said cover, said vertical rib being formed with a recess provided with a hook member extending inwardly out of a rear wall of said cover and engageable with said slot of said vertical partition.

* * * * *